(12) United States Patent
Kathuria et al.

(10) Patent No.: US 7,620,668 B2
(45) Date of Patent: Nov. 17, 2009

(54) AUTHORITATIVE AND NON-AUTHORITATIVE RESTORE

(75) Inventors: Vishal Kathuria, Woodinville, WA (US); Martin J. Sleeman, Redmond, WA (US); Robin Dhananjay Dhamankar, Redmond, WA (US); Hanumantha Rao Kodavalla, Sammamish, WA (US); Yunxin Wu, Kirkland, WA (US); Shaoyu Zhou, Issaquah, WA (US); Lev Novik, Bellevue, WA (US); Tomas Talius, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 462 days.

(21) Appl. No.: 11/124,219

(22) Filed: May 6, 2005

(65) Prior Publication Data

US 2006/0265434 A1    Nov. 23, 2006

(51) Int. Cl.
*G06F 12/00* (2006.01)
*G06F 17/30* (2006.01)
(52) U.S. Cl. .................. 707/204; 707/200; 707/202
(58) Field of Classification Search .............. 707/204, 707/200, 202
See application file for complete search history.

(56) References Cited

U.S. PATENT DOCUMENTS

| | | | | |
|---|---|---|---|---|
| 5,594,863 A | * | 1/1997 | Stiles | 714/15 |
| 5,974,424 A | * | 10/1999 | Schmuck et al. | 707/201 |
| 6,012,059 A | * | 1/2000 | Neimat et al. | 707/8 |
| 6,065,018 A | * | 5/2000 | Beier et al. | 707/202 |
| 6,088,694 A | * | 7/2000 | Burns et al. | 707/8 |
| 6,163,856 A | * | 12/2000 | Dion et al. | 714/4 |
| 6,247,024 B1 | * | 6/2001 | Kincaid | 707/204 |
| 6,289,357 B1 | * | 9/2001 | Parker | 707/202 |
| 6,345,288 B1 | * | 2/2002 | Reed et al. | 709/201 |
| 6,438,661 B1 | * | 8/2002 | Beardsley et al. | 711/144 |
| 6,453,325 B1 | * | 9/2002 | Cabrera et al. | 707/204 |
| 6,496,944 B1 | * | 12/2002 | Hsiao et al. | 714/15 |
| 6,499,039 B1 | * | 12/2002 | Venkatesh et al. | 707/204 |
| 6,502,108 B1 | * | 12/2002 | Day et al. | 707/203 |

(Continued)

FOREIGN PATENT DOCUMENTS

EP    1 349 089 A2  *  1/2003
EP    1 455 265 A2  *  8/2004

OTHER PUBLICATIONS

Cooper, Brian F., et al., "InfoMonitor: Unobtrusively Archiving a World Wide Web Server", International Journal on Digital Libraries, vol. 5 No. 2, Feb. 10, 2005 (published online), pp. 106-119.*

(Continued)

*Primary Examiner*—Robert Stevens
(74) *Attorney, Agent, or Firm*—Workman Nydegger

(57) ABSTRACT

The subject invention relates to systems and/or methods that perform an authoritative and/or a non-authoritative restore of items in a data store. Backups are provided that include data associated with items and metadata related to the items that can include a history of operations and previous synchronizations to enable replications to converge after restoration. The operations that can be performed on the items include, for example, create, delete, update, move, etc. The items in the backups can be restored along with the metadata, which can be utilized to enable synchronization partners to converge based on a desired type of restoration.

15 Claims, 11 Drawing Sheets

U.S. PATENT DOCUMENTS

| | | | |
|---|---|---|---|
| 6,505,216 B1* | 1/2003 | Schutzman et al. | 707/204 |
| 6,564,215 B1* | 5/2003 | Hsiao et al. | 707/8 |
| 6,611,923 B1* | 8/2003 | Mutalik et al. | 714/4 |
| 6,651,077 B1* | 11/2003 | East et al. | 707/204 |
| 6,665,689 B2* | 12/2003 | Muhlestein | 707/204 |
| 6,708,227 B1* | 3/2004 | Cabrera et al. | 719/328 |
| 6,714,952 B2* | 3/2004 | Dunham et al. | 707/204 |
| 6,832,330 B1* | 12/2004 | Boudrie et al. | 714/6 |
| 6,847,984 B1* | 1/2005 | Midgley et al. | 707/204 |
| 6,959,368 B1* | 10/2005 | St. Pierre et al. | 711/162 |
| 7,346,623 B2* | 3/2008 | Prahlad et al. | 707/102 |
| 2002/0091710 A1* | 7/2002 | Dunham et al. | 707/200 |
| 2002/0095616 A1* | 7/2002 | Busser | 714/8 |
| 2002/0133559 A1* | 9/2002 | Arnon et al. | 709/211 |
| 2002/0188667 A1* | 12/2002 | Kirnos | 709/203 |
| 2004/0139125 A1* | 7/2004 | Strassburg et al. | 707/202 |
| 2004/0255048 A1* | 12/2004 | Lev Ran et al. | 709/249 |
| 2005/0015413 A1* | 1/2005 | Teodosiu et al. | 707/201 |
| 2005/0027755 A1* | 2/2005 | Shah et al. | 707/201 |
| 2005/0044108 A1* | 2/2005 | Shah et al. | 707/104.1 |
| 2005/0044187 A1* | 2/2005 | Jhaveri et al. | 709/219 |
| 2005/0044530 A1* | 2/2005 | Novik | 717/122 |
| 2005/0091346 A1* | 4/2005 | Krishnaswami et al. | 709/220 |
| 2005/0102329 A1* | 5/2005 | Jiang et al. | 707/204 |
| 2005/0195660 A1* | 9/2005 | Kavuri et al. | 365/189.05 |
| 2005/0278385 A1* | 12/2005 | Sutela et al. | 707/200 |
| 2005/0278458 A1* | 12/2005 | Berger et al. | 709/248 |

OTHER PUBLICATIONS

Gladney, Henry M., "Trustworthy 100-Year Digital Objects: Evidence After Every Witness Is Dead", ACM Transactions on Information Systems, vol. 22 No. 3, Jul. 2004, pp. 406-436.*

Soules, Craig A. N., et al., "Metadata Efficiency in Versioning File Systems", FAST '03, San Francisco, CA, Mar. 31-Apr. 2, 2003, pp. 43-58.*

Patterson, Hugo, et al., "SnapMirror®: File System Based Asynchronous Mirroring for Disaster Recovery", FAST 2002, Monterey, CA, Jan. 28-30, 2002, Article 9, pp. 1-13.*

Landers, Martin, et al., "PeerStore: Better Performance by Relaxing in Peer-to-Peer Backup", P2P '04, Aug. 25-27, 2004, pp. 72-79.*

Bhattacharya, Suparna, et al., "Coordinating Backup/Recovery and Data Consistency Between Database and File Systems", SIGMOD 2002, Madison, WI, Jun. 4-6, 2002, pp. 500-511.*

Piernas, Juan, et al., "DualFS: A New Journaling File System Without Meta-Data Duplication", ICS '02, New York, NY, Jun. 22-26, 2002, pp. 137-146.*

Dullman, Dirk, et al., "Models for Replica Synchronisation and Consistency in a Data Grid", 10th IEEE Int'l Conf. on High Performance Distributed Computing, Aug. 7-9, 2001, pp. 67-75.*

Soares, Livio B., et al., "Meta-data Snapshotting: A Simple Mechanism for File System Consistency", SNAPI'03, New Orleans, LA, Sep. 27-Oct. 1, 2003, pp. 1-12.*

Bontempo, Charles, et al., "The IBM Data Warehouse Architecture", Communications of the ACM, vol. 41, Issue 9, Sep. 1998, pp. 38-48.*

Agrawal, Sanjay, et al., "Database Tuning Advisor for Microsoft SQL Server 2005", VLDB 2004, Toronto, Canada, Aug. 29-Sep. 3, 2004, pp. 1110-1121.*

Sinitsyn, Alexander, "A Synchronization Framework for Personal Mobile Servers", PERCOMW '04, Mar. 14-17, 2004, pp. 208-212.*

Dehghani, Navid, "The ASTER Emergency Backup System", SPIE International Symposium, San Diego, CA, Jul. 21, 1998, pp. 1-6.*

Hsiao, Hui-I, "DLFM: a Transactional Resource Manager System", MOD 2000, Dallas, TX, ©2000, pp. 518-528.*

Qu, Zhiwei, et al., "Efficient Data Restoration for a Disk-Based Network Backup System", ICCCAS 2004, Jun. 27-29, 2004, pp. 584-590.*

Vahalia, Uresh, et al., "Metadata Logging in an NFS Server", Proc. of the USENIX 1995 Technical Conference, New Orleans, LA, Jan. 16-20, 1995, pp. 1-12.*

* cited by examiner

US 7,620,668 B2

AUTHORITATIVE AND NON-AUTHORITATIVE RESTORE

TECHNICAL FIELD

The subject invention generally relates to databases, and more particularly to systems and methods that facilitate performing authoritative and/or non-authoritative restoration of data in connection with a data storage system.

BACKGROUND OF THE INVENTION

Advances in computer technology (e.g., microprocessor speed, memory capacity, data transfer bandwidth, software functionality, and the like) have generally contributed to increased computer application in various industries. Ever more powerful server systems, which are often configured as an array of servers, are commonly provided to service requests originating from external sources such as the World Wide Web, for example.

As the amount of available electronic data grows, it becomes more important to store such data in a manageable manner that enables user friendly and quick data searches and retrievals. Today, a common approach is to store electronic data in one or more databases. In general, a typical database can be referred to as an organized collection of information with data structured such that a computer program can quickly search and select desired pieces of data, for example. Commonly, data within a database is organized via one or more tables. Such tables are arranged as an array of rows and columns.

Also, the tables can comprise a set of records, wherein a record includes a set of fields. Records are commonly indexed as rows within a table and the record fields are typically indexed as columns, such that a row/column pair of indices can reference particular datum within a table. For example, a row can store a complete data record relating to a sales transaction, a person, or a project. Likewise, columns of the table can define discrete portions of the rows that have the same general data format, wherein the columns can define fields of the records.

Each individual piece of data, standing alone, is generally not very informative. Database applications make data more useful because they help users organize and process the data. Database applications allow the user to compare, sort, order, merge, separate and interconnect the data, so that useful information can be generated from the data. Capacity and versatility of databases have grown incredibly to allow virtually endless storage capacity utilizing databases.

As greater amounts of information are being stored electronically, a more pressing need to protect this electronic information is yielded. To safeguard electronic information, data is oftentimes copied to create a second version, or backup, of an original source. The data typically copied during a backup can be stored program code, data associated with a program, or a combination thereof. The backup can be stored on a hard disk, large capacity magnetic tape storage, optical disk media (e.g., CD-R, DVD-R, . . . ), or any type of storage media.

The backup can be utilized to restore data, for example, in the case of damage or loss of a hard disk, corruption of data, etc. Oftentimes, however, a backup does not include all changes (e.g., updating, creating, deleting, moving, . . . ) that have been made to the data prior to media failure and after the backup was taken; thus, the restored data differs from the pre-failure version of the data. Returning the data to the pre-failure version by repeating the changes made subsequent to the backup can be costly in terms of a user's time and effort, system resources, etc. and/or may not feasibly be accomplished (e.g., not possible to recreate a digital photograph of a prior event if the data was not backed up). According to another example, a backup can be restored to revert back to a previous version of data associated with the original source from a current version of the data that has been corrupted, undesirably altered, etc. According to this example, conventional techniques can inappropriately return the data to the pre-restore version if the data is synchronized with a disparate replica of the data. Thus, a number of problems and difficulties are associated with currently employed techniques to restore data via utilizing a backup.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that perform an authoritative and/or a non-authoritative restore of items in a data store. Backups are provided that include data associated with items and metadata related to the items that can include a history of operations and previous synchronizations to enable replications to converge after restoration. The operations that can be performed on the items include, for example, create, delete, update, move, etc. The items in the backups can be restored along with the metadata, which can be utilized to enable synchronization partners to converge based on a desired type of restoration.

The subject invention can restore one or more items in a target store and synchronize the restored items with any number of synchronization partners (e.g., replicas). For example, the items can be restored utilizing an authoritative restore and/or a non-authoritative restore. By way of illustration, the authoritative restore can be employed to return to a backup version of the items. The authoritative restore can be utilized to synchronize the replicas with the restored items by updating the replicas, and thus, causing the replicas to converge to the value of the restored items. According to another example, the non-authoritative restore can be utilized to return the restored items to previous versions of the items. The non-authoritative restore can be performed, for instance, when a current version of the items and/or store(s) comprising the items is lost (e.g., due to hard disk failure, . . . ). Thus, the backup of the items is restored and if the replica has been changed more recently than the restored items, then the restored items are brought up to date with the replica. Additionally or alternatively, if the restored items are more current than the replica, then the replica can be appropriately updated.

According to an aspect of the subject invention, a system is provided that facilitates restoring an item in a target store. The system can include a restoration component that restores a backup of an item and synchronization metadata associated with the item in a target store. Additionally, the system can comprise a synchronization component that utilizes the synchronization metadata associated with the item to synchronize the restored item with a replica of the item.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
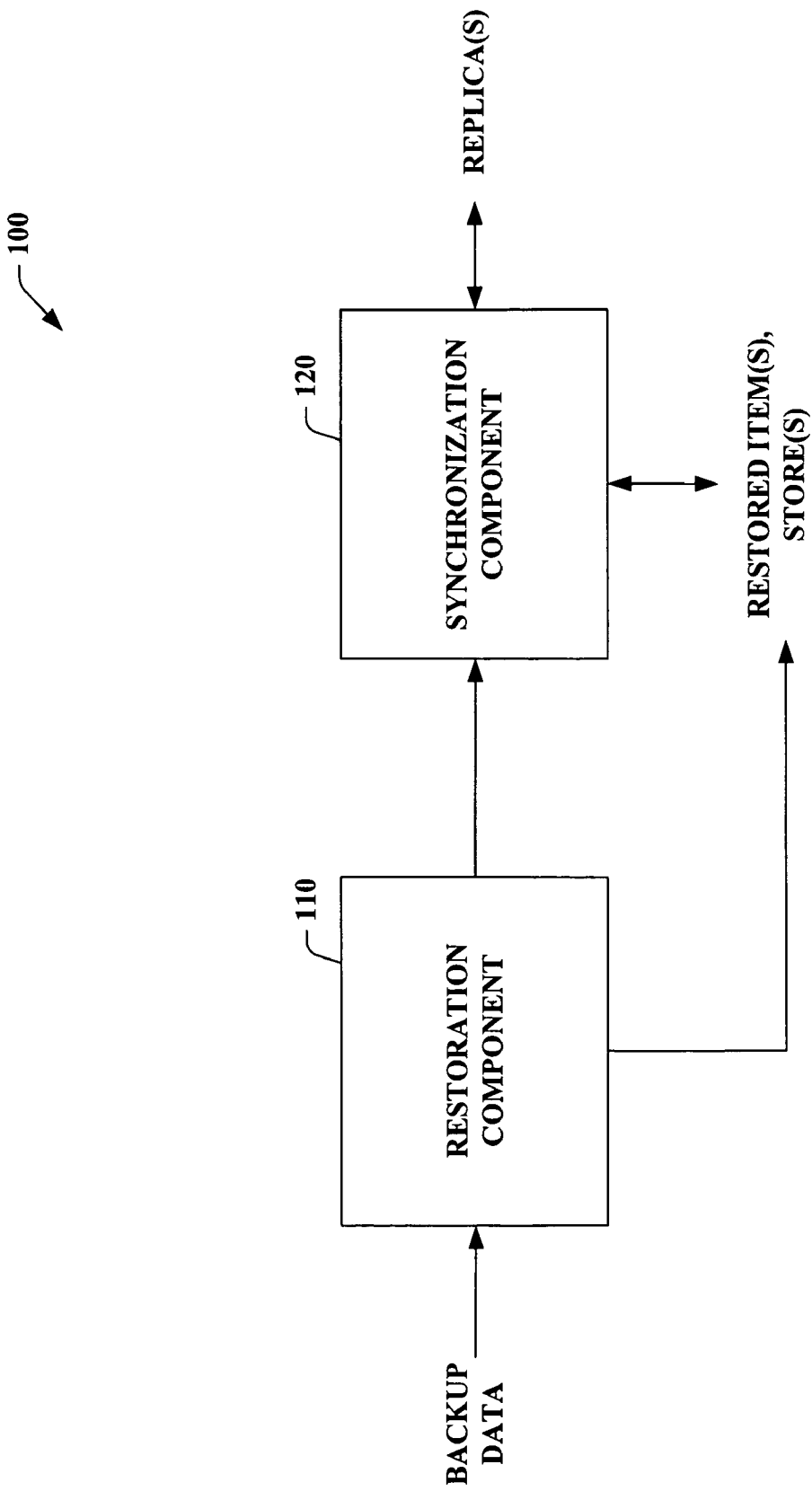
FIG. 1 illustrates a block diagram of a system that facilitates performing restoration(s) of data in accordance with an aspect of the subject invention.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Turning now to FIG. 1, illustrated is a system 100 that facilitates performing restoration(s) of data in accordance with an aspect of the subject invention. The system 100 includes a restoration component 110 that restores data and a synchronization component 120 that synchronizes the data (e.g., pre-restore data, restored data, . . . ) with replica(s) of the data. The restoration component 110 can initiate restoring data upon receiving a user input (e.g., via any user input device such as a mouse, keyboard, touchpad, touch screen, trackball, joystick, stylus, microphone, proximity sensor, motion sensor, temperature sensor, biometric input, . . . ), a signal from a hardware device (e.g., an indication from a CD drive notifying the restoration component 110 that a CD including backup data has been inserted, . . . ), an application (e.g., an application that facilitates determining data to restore from a backup, . . . ), a combination thereof, etc. For example, the restoration component 110 can automatically begin restoration upon receipt of backup data.

Backup data is provided to the restoration component 110 to restore all or a portion of the backup. The backup data can be obtained by the restoration component 110 from any type of storage media (e.g., hard disk, large capacity magnetic tape storage, optical disk media such as CD-R(s) and DVD-R(s), . . . ). The backup data can include a copy of one or more items from a data storage system. Also, the backup data can include corresponding synchronization metadata associated with the item or collection of items. The backup data can be generated from an item level backup, a store level backup, and/or a backup of any granularity. Additionally, the backup data can be associated with a full backup, an incremental backup, etc. The restoration component 110 restores the backup of the item(s) and/or the store(s). For example, the restoration component 110 can perform authoritative and/or non-authoritative restoring of the item(s) and/or store(s).

The synchronization component 120 enables establishing a synchronization relationship between one or more items and replica(s) of the one or more items. The item(s) and the replica(s) of the item(s) can be associated with similar data stores on disparate devices. By way of example, item(s) can be stored on a desktop computer and a replica of the item(s) can be stored on a laptop computer. Pursuant to this example, the synchronization component 120 can automatically update the replica on the laptop to incorporate any changes (e.g., operations such as create, delete, update, move, . . . ) that are made to the item(s) on the desktop, and vice versa, when synchronization is performed. The subject invention contemplates that the item(s) and the replica can be stored on any device and is not limited to the aforementioned example. Additionally, any number of replicas of items can be synchronized utilizing the synchronization component 120 in connection with the subject invention. Further, the item(s) and the replica(s) of the items can be stored on the same device (e.g., disparate folders on the same data store).

The synchronization component 120 additionally synchronizes the restored item(s) and/or store(s) (hereinafter referred to as "restored item") with the corresponding replica(s). The synchronization component 120 can obtain an indication from the restoration component 110 as to the desired type of restoration (e.g., authoritative, non-authoritative, . . . ). Additionally or alternatively, the synchronization component 120 can determine the appropriate restoration type based on the restored item, and/or metadata associated with the restored item. Based on the type of restoration, the synchronization component 120 can update the restored item and/or the corresponding replica(s). For example, if the restoration component 110 initiates a non-authoritative restore, the synchronization component 120 can identify later versions of the restored item that are associated with the replica(s) and appropriately update the restored item. By way of another illustration, the restoration component 110 can execute an authoritative restore such that the synchronization component 120 can endeavor to change all other replicas to the same restored value of the restored item, achieving an effect similar to restoring every other replica with the restoration component 110 from the same backup data. The synchronization component 120, for instance, can perform the synchronization without utilizing a master.

The data storage system utilized in connection with the subject invention can be a database-based file storage system that utilizes at least one database structure, wherein an item, a sub-item, a property, and a relationship are defined to allow representation of information within the data storage system as instances of complex types. The data storage system can employ a set of basic building blocks for creating and managing rich, persisted objects and links between objects. An item can be defined as the smallest unit of consistency within the data storage system, which can be independently secured, serialized, synchronized, copied, backed up, restored, etc. The item is an instance of a type, wherein all items in the data storage system can be stored in a single global extent of items. The data storage system can be based upon at least one item and/or a container structure. For example, an item within the data storage system can have various properties, wherein a data change (e.g., a name update, a value update, a deletion of a property, . . . ) to a property can be invoked. Rather than replacing the entire item to update a single property change, a granular and/or proportional change to the item can be performed, wherein the property is updated with the data change.

As used in this application, an "item" comprises a core item, for example, a document or a contact, which can include property(ies) (e.g., title, display name). An item can be simple or compound (e.g., includes other item(s) embedded in it). For instance, a document can include an embedded spreadsheet that comprises data. Items can comprise additional information associated with the core item such as backing file(s), link(s) from the core item, extension(s), link id(s) of incoming link(s), security descriptor of the item(s), etc. Additionally, a replica refers to another copy of the item and/or a set of items with which synchronization happens. A replica item is an entity and/or an item that maintains information (like synchronization history) about a particular copy of the item and/or set of items.

Figure 2:
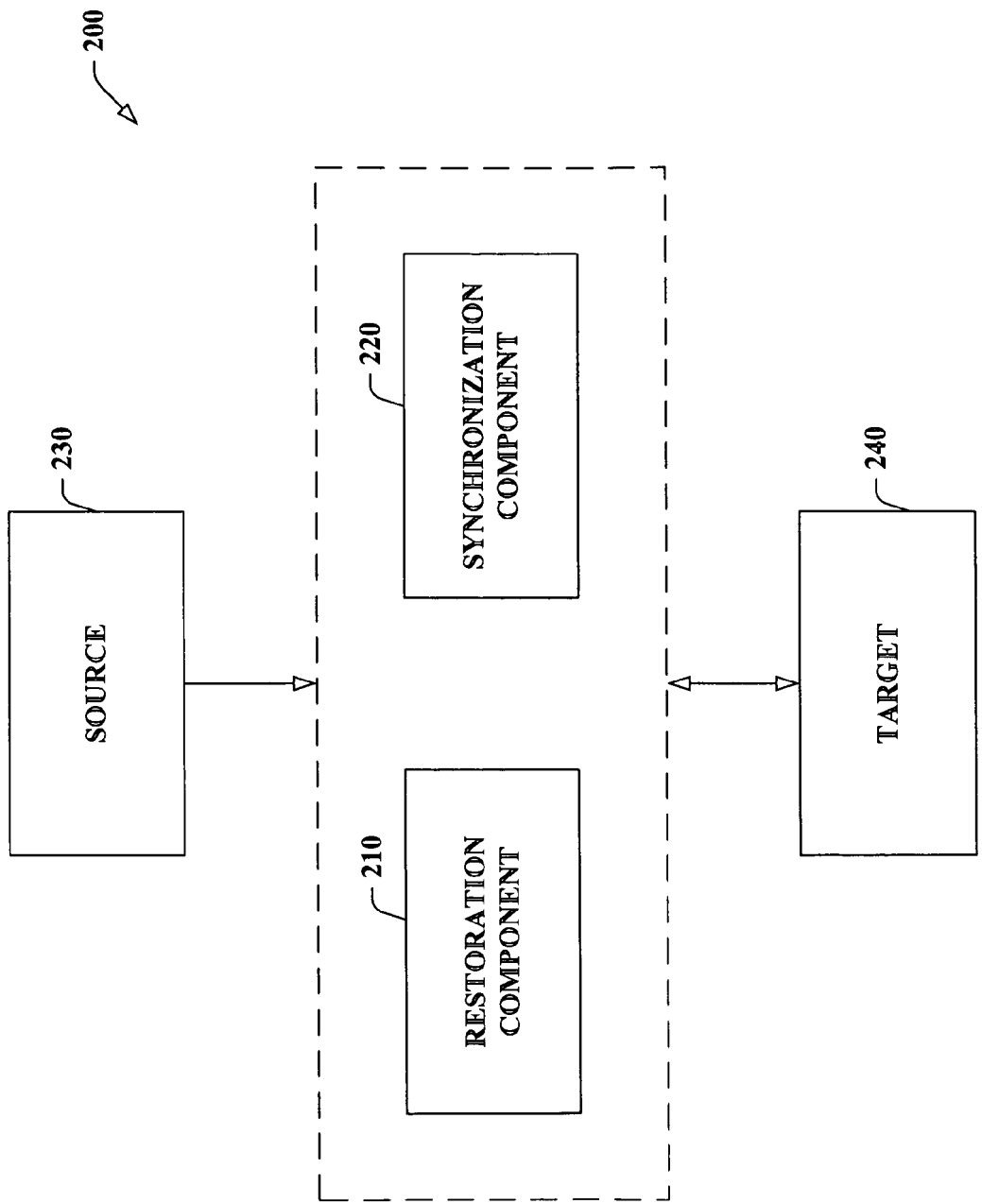
FIG. 2 illustrates a block diagram of a system that restores a backup upon a target in accordance with an aspect of the subject invention.

With reference to FIG. 2, illustrated is a system 200 that restores a backup upon a target in accordance with an aspect of the subject invention. The system 200 includes a restoration component 210 that restores a backup or a portion thereof and a synchronization component 220 that synchronizes an item with a sync partner (e.g., replica of the item). The system 200 further comprises a source 230 and a target 240.

The source 230 can provide data to the restoration component 210. For example, the data provided by the source 230 can be a backup of item(s) and/or store(s). By way of further illustration, the source 230 can provide information associated with a history of operations such as create, delete, update, move, etc. as metadata associated with the item(s). The source 230 can be any storage medium. For example, the source 230 can be a hard disk, a large capacity magnetic tape storage, an optical disk media such as CD-R(s) and DVD-R(s), etc. The data provided by the source 230 is utilized to restore item(s) and/or synchronize the item(s) with corresponding replica(s) in a desired manner. The data can be obtained from the source 230 by the restoration component 210 and/or the synchronization component 220 via any type of connection (e.g., wireless, wired, bus, interface, . . . ).

The item(s) are restored and/or synchronized with other replicas upon the target 240 by employing the restoration component 210 and/or the synchronization component 220. The target 240 can be any type of storage medium (e.g., a hard disk, a large capacity magnetic tape storage, optical disk media such as CD-R(s) and DVD-R(s), . . . ). Additionally or alternatively, the target 240 can be associated with any type of device that utilizes such storage media. For example, the target 240 can be related to a desktop computer, a laptop computer, a tablet, a handheld computer, a PDA, and/or a cellular phone; however, the subject invention is not limited to such examples. The target 240 can be coupled to the restoration component 210 and/or the synchronization component 220 via any type of connection (e.g., wireless, wired, bus, interface, . . . ). The restored item(s) can have a corresponding replica that is also stored upon the target 240. Additionally or alternatively, a replica of the restored item(s) can be existent upon any disparate storage medium. By way of illustration, the restored item(s) and/or metadata associated with the restored item(s) can be utilized by the synchronization component 220 to update the replica(s). According to another example, the synchronization component 220 can determine values associated with the replica(s) and/or metadata associated with the replicas, and employ these values and/or metadata to alter the restored item(s).

The source 230 and/or the target 240 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The subject invention contemplates that the source 230 and/or the target 240 can additionally or alternatively be a hard disk, a large capacity magnetic tape storage, optical disk media (e.g., CD-R, DVD-R, . . . ), or any type of storage media. The source 230 and/or the target 240 of the subject systems and methods are intended to comprise, without being limited to, these and any other suitable types of memory.

Figure 3:
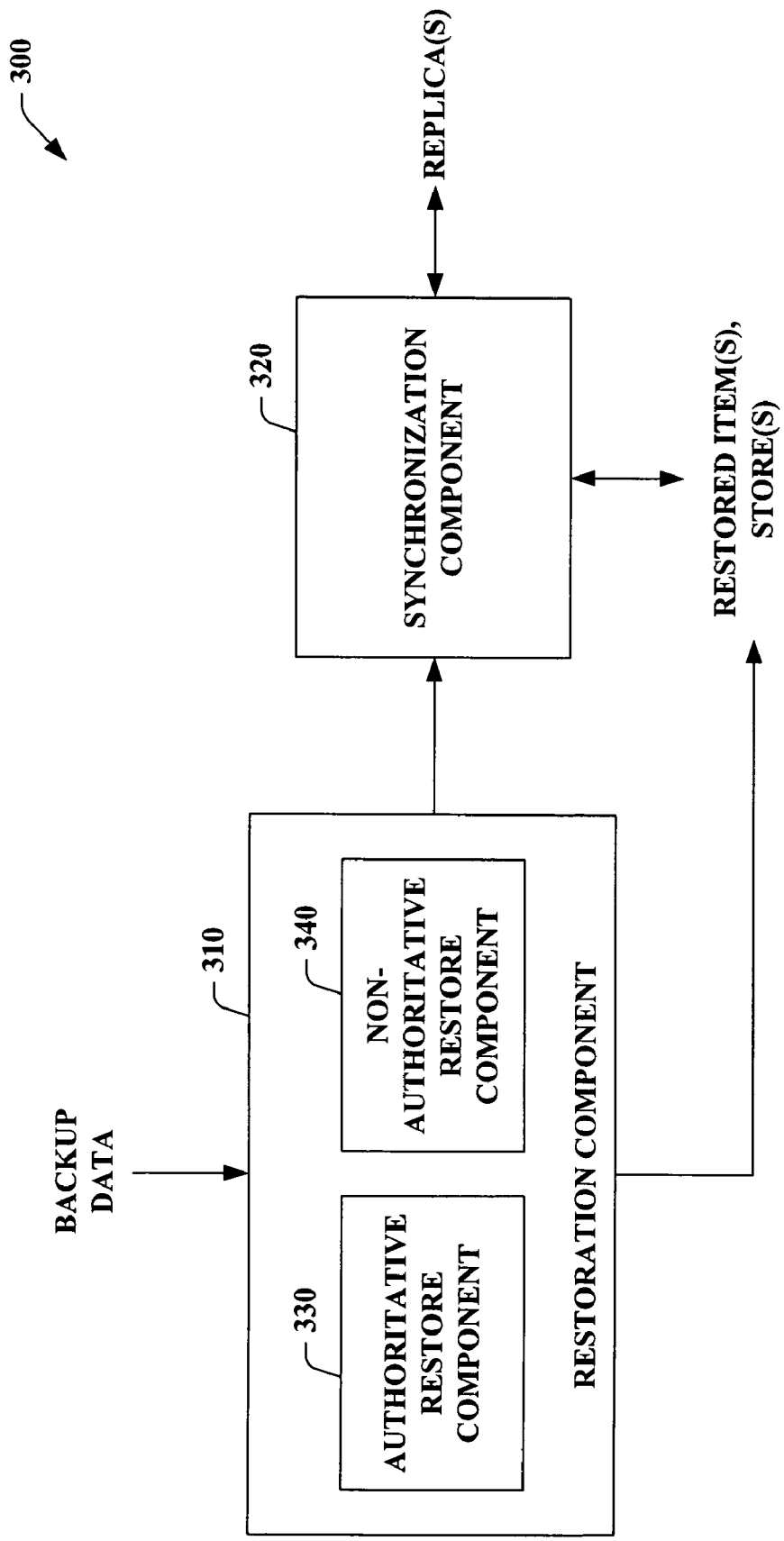
FIG. 3 illustrates a block diagram of a system that facilitates executing authoritative and/or non-authoritative restores of items in accordance with an aspect of the subject invention.

Turning to FIG. 3, illustrated is a system 300 that facilitates executing authoritative and/or non-authoritative restores of items in accordance with an aspect of the subject invention. The system 300 includes a restoration component 310 that performs single item restores that can interact properly with synchronization partners and a synchronization component 320 that synchronizes restored item(s) and/or store(s) (hereinafter referred to as "restored item") and replica(s). The restoration component 310 further comprises an authoritative restore component 330 and a non-authoritative restore component 340.

The restoration component 310 receives backup data, which can include items and metadata associated with the items. Additionally, metadata can be associated with the replica(s) of the items. The metadata associated with the backed up items and replicas is stored and can be utilized to synchronize changes to items across replicas. The metadata can include, for example, timestamps on entities, change tracking at the change unit level, sync metadata for global id mapping, tombstones for tracking deletes, a move log for tracking item moves, conflict items for keeping track of unresolved conflicts, replica items for replica and partner information, and/or mapping items.

An item that is in a synchronization relationship can become corrupt and/or undesirably altered. For example, in a situation where a user has a laptop computer and a desktop computer, a folder stored upon memory of both computers that includes music files can be synchronized such that when an item in one folder is altered, the change is propagated to the other folder. If one of the music files is undesirably edited on the laptop computer, the change will be propagated to the corresponding item on the desktop when the computers are synchronized. The authoritative restore component 330 enables a backup of the item to be restored on the laptop, for example. The authoritative restore component 330 can provide a signal to the synchronization component 320 indicating that an authoritative restore is to be effectuated. Additionally or alternatively, the authoritative restore component 330 can restore the item(s) in a manner that enables the synchronization component 320 to evaluate the restored item(s) and determine that an authoritative restore is to be performed. For example, changes can be made to the metadata associated with the restored item(s). The synchronization component 320 can then change the replica on the desktop to the same restored value.

The non-authoritative restore component 340 can be employed, for example, when a current version of an item and/or database is lost (e.g., due to media failure). The non-authoritative restore component 340 enables the synchronization component 320 to reapply changes that were made to items since a time of the backup. The backup data is utilized by the non-authoritative restore component 340 to restore the item(s). However, if any of the replicas have a more recent version of the changes than the restored item, then the restored item is updated by the synchronization component 320 to receive these variations. Additionally or alternatively, if another replica does not have the changes that are present in the restored item from the backup data, then the restored item provides these changes to the other replicas via the synchronization component 320.

Figure 4:
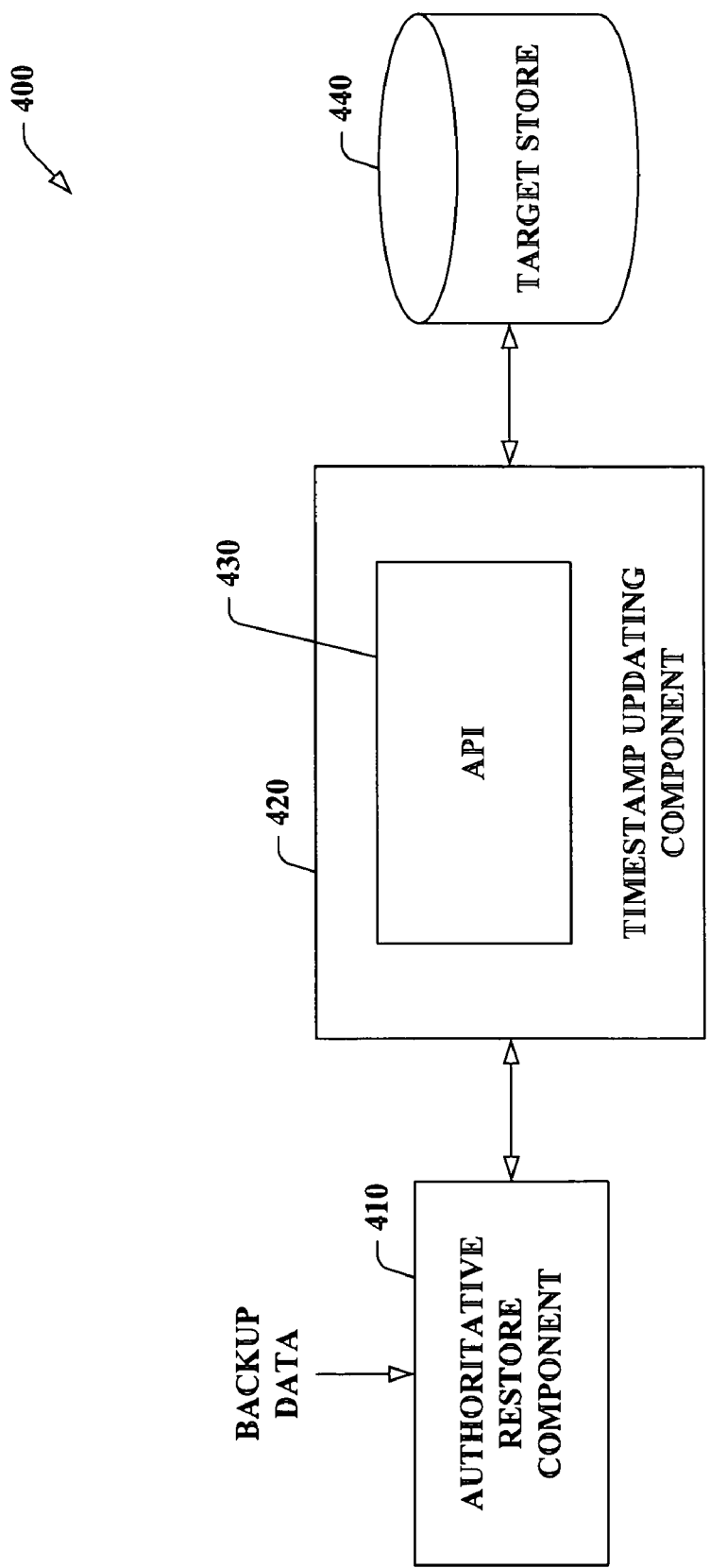
FIG. 4 illustrates a block diagram of a system that performs an authoritative restore of a backup item according to an aspect of the subject invention.

FIG. 4 illustrates a system 400 that performs an authoritative restore of a backup item according to an aspect of the subject invention. The system 400 includes an authoritative restore component 410 that receives backup data, which can include copies of item(s) and/or metadata associated with the copied item(s). The item(s) can be synchronized with replica(s) (e.g., utilizing a synchronization component 120 of FIG. 1, 220 of FIG. 2, 320 of FIG. 3). Additionally, the authoritative restore component 410 can be comprised within a restoration component (e.g., restoration component 110 of FIG. 1, 210 of FIG. 2, 310 of FIG. 3) and/or can be associated with a non-authoritative restore component (e.g., non-authoritative restore component 340 of FIG. 3). The authoritative restore component 410 is coupled to a timestamp updating component 420 that alters a timestamp associated with metadata of an item to be restored. The timestamp updating component 430 further comprises an API 430 that facilitates creating and/or replacing items that are being restored in a target store 440 (e.g., target 240 of FIG. 2). The API 430 is depicted as being comprised within the timestamp updating component 420. It is to be appreciated, however, that the API 430 can be separate from the timestamp updating component 420, the API 430 can comprise the timestamp updating component 420, a portion thereof, vice versa, etc. Additionally, it is to be appreciated that the authoritative restore component 410 can comprise the timestamp updating component 420 and/or the API 430.

In the case of an authoritative restore utilizing the authoritative restore component 410, synchronization information for the restored item(s) is already present in a target store 440 when the backup data is copied. The authoritative restore component 410 seeks to perform a change that emulates an update. By way of illustration, an authoritative item level restore can be treated as a local change so as to propagate the restored item(s) to all replicas. Such a change can be achieved by not manipulating any of the change tracking information in the target store 440 and enabling a base layer to maintain such information, and not restoring an entity such as a replica item in which a synchronization infrastructure maintains its metadata.

The metadata associated with each item can include a timestamp related to when the item was last updated. The timestamp, for example, can be an increasing integer. Whenever a change is made to an item, the timestamp increases. Thus, the timestamp can be employed to identify a most current version of the item to which other replica(s) should be converged towards (e.g., via synchronization component 120, 220, 320). Accordingly, to facilitate performing an authoritative restoration, the timestamp updating component 420 can update the timestamp of a restored item in the target store 440 such that it becomes the most current timestamp. Since the restored item(s) has the most recent timestamp, the other replica(s) are updated to the value of the restored item(s). By way of example, if the restored item has a timestamp of 50 and the current timestamp is 100, then the timestamp updating component 420 can change the timestamp of the restored item to 100. Thus, if an item in the replica has a timestamp of 75, then the replica is updated to the value of the restored item (as opposed to the restored item being updated to the value of the replica as could otherwise occur).

The system 400 can support creating, deleting, updating, moving, etc. of items. For example, the backup can include a tombstone of an item. When an item and/or an entity is deleted, a tombstone corresponding to that item and/or entity is stored that indicates the deletion. The tombstone can be utilized to synchronize delete operations to other replica(s). If a backup includes a tombstone of an item, then the item can be deleted from the target store 440. This deletion ends up creating a new tombstone and the tombstone from the backup is not restored. According to another illustration, if an item in the backup has been deleted since the backup was taken, then the item is resurrected in the target store 440. Pursuant to another example, metadata associated with items and/or replicas of items can comprise a move log that contains the history of move operations for an item. The move log information in the backup can be ignored by the authoritative restore component 410 (and/or the timestamp updating component 420 and/or the API 430) because if the location of the item in the backup is different from the location in the target store 440, then the item can be moved to the old location and the new move log entries can be generated by a base API.

According to an example, the API 430 can be two disparate APIs that are utilized to perform an item level restore (e.g., one API can create an item, another API can replace an item, . . . ). According to an illustration, if the item to be restored does not exist in the target store 440, the authoritative restore component 410 can call a CreateItem (or Entity) API (e.g., API 430). Pursuant to this illustration, the CreateItem API is not passed in any of sync metadata that was backed up. Additionally, the CreateItem API can resurrect a tombstone of a deleted item (or entity) if the tombstone already exists. Alternatively, if the tombstone does not already exist and has been cleaned up, then a new item can be created via the API 430. The new item can have the same itemId and a disparate globalId. Replica(s) of the item (not shown) will consider this to be a newly created item as opposed to an old item resurrected.

Upon creating a new item, if there is a synchronization to another replica that had yet to be synchronized with the replica comprising the deletion of the old item, the other replica can have both the old version of the item and the restored version of the item. This occurs when a tombstone is cleaned up in one replica before other replica(s) have been synchronized to the replica with the deletion. The synchronization component (e.g., synchronization component 120, 220, 320) can identify such a situation and utilize a slow sync to converge the two replicas.

Pursuant to another example, the authoritative restore component 410 can determine whether an item to be restored already exists in the target store 440 and accordingly call a replace version of the API 430. The replace version of the API 430 is utilized to overwrite an item such that the extensions and/or links for this item can be deleted from the target store 440 and recreated from the backup version.

Additionally, certain synchronization specific item types that contain metadata regarding synchronization history and past conflicts, such as Replica, Mapping, and Conflict items may not be affected by the authoritative restore component 410. Accordingly, the API 430 can skip these items in connection with an authoritative restore. Alternatively, these items can be employed with a non-authoritative restore.

Figure 5:
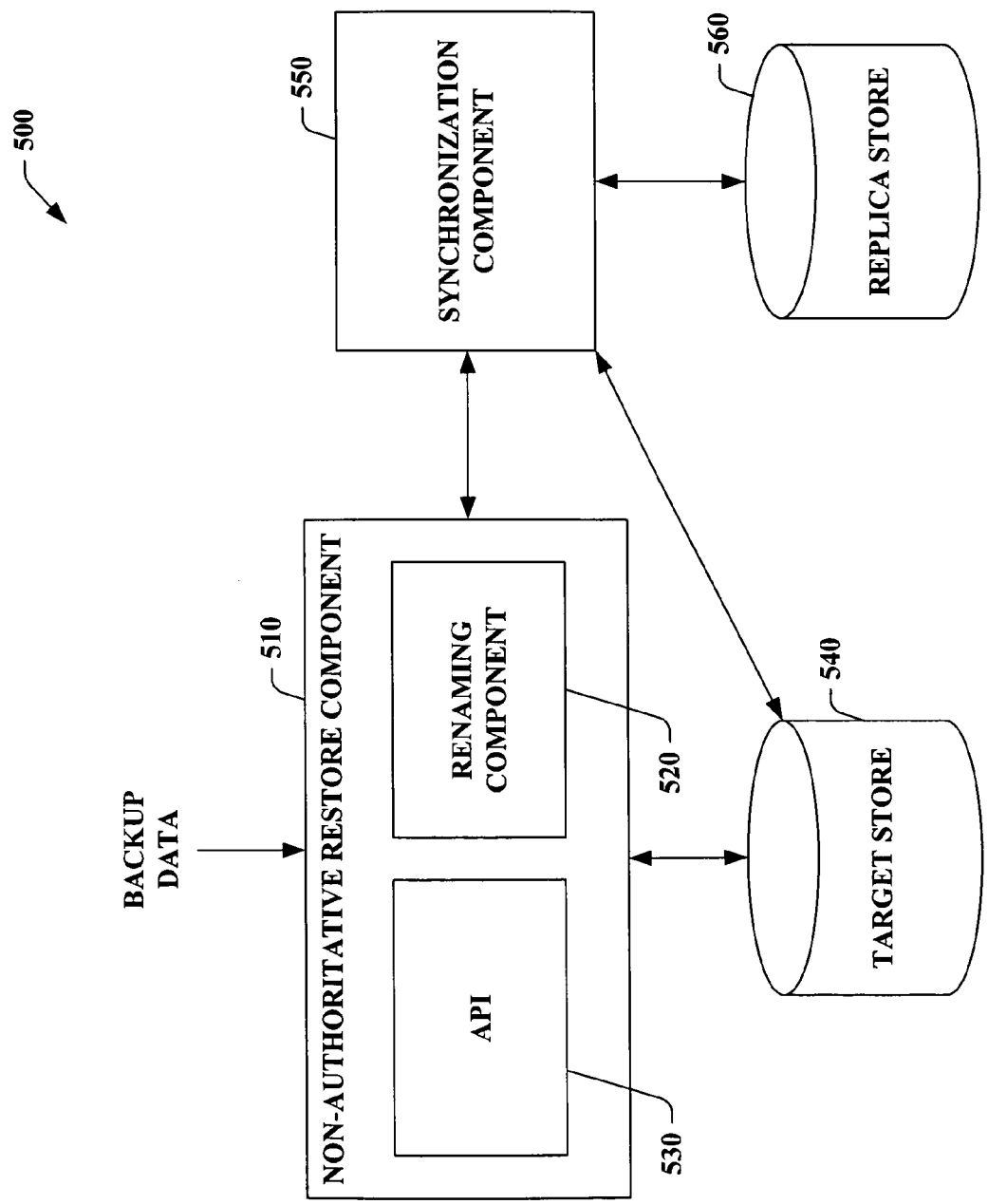
FIG. 5 illustrates a block diagram of a system that facilitates performing a non-authoritative restore of backed up item(s) according to an aspect of the subject invention.

With reference to FIG. 5, depicted is a system 500 that facilitates performing a non-authoritative restore of backed up item(s) according to an aspect of the subject invention. The system 500 includes a non-authoritative restore component 510 that obtains backup data. The non-authoritative restore component 510 further comprises a renaming component 520 that renames a replica and an API 530. The non-authoritative restore component 510 restores the backed up data to a target store 540 (e.g., target 240 of FIG. 2). The system 500 additionally includes a synchronization component 550 that is coupled to the non-authoritative restore component 510, the target store 540, and/or a replica store 560. It is to be appreciated that the target store 540 and the replica store 560 can be the same storage medium. Additionally, any number of replica stores 560 can be utilized in connection with the subject invention. Furthermore, the subject invention is not limited to the non-authoritative restore component 510 comprising the renaming component 520 and the API 530 as either, both or a portion thereof can be separate. Also, the non-authoritative restore component 510 can be included as part of a restoration component (e.g., restoration component 110 of FIG. 1, 210 of FIG. 2, 310 of FIG. 3) and/or in connection with an authoritative restore component (e.g., authoritative restore component 330 of FIG. 3, 410 of FIG. 4).

According to an example, the non-authoritative restore component 510 can be employed to restore a backup in case of a disaster such as, for example, a hard disk failure and/or corruption of an entire storage medium. The non-authoritative restore component 510 can restore the backup data to the target store 540. Additionally, if the synchronization component 550 determines that another replica (e.g., stored on the replica store 560) has more recent changes than the restored replica on the target store 540, then the synchronization component 550 updates the restored version with the appropriate changes. The synchronization component 550 can also identify whether another replica on the replica store 560 lacks the changes that the restored replica has, and in such a case provide those changes to the replica on the replica store 560.

The restored replica on the target store 540, for example, can act as a replica that was synchronized with the replica on the replica store 560 at the time of the backup and has not since been synchronized with any replica. Such a result can be accomplished by restoring the backup data to the target store 540 with the non-authoritative restore component 510 and providing the restored replica with a new ReplicaId via employing the renaming component 520.

The following example illustrates the use of the renaming component 520. By way of example, assume that there are two replicas (R1 and R2). A timestamp of R1 is 100 and a backup was taken when the timestamp of R1 was 50. Additionally, R2's timestamp is 200. If R1 is being restored with the non-authoritative restore component 510 (e.g., R1 was destroyed, . . . ) and the ReplicaId is not changed, then R2 would not send the changes to R1 that occurred subsequent to the backup of R1, since R1 sent them to R2 initially. Alternatively, if the ReplicaId of R1 is changed to R3 by the renaming component 520 when the backup data is restored, then R3 would indicate to R2 that is has been synchronized up to timestamp 50 with R1. Additionally, R2 could then send the changes that it received from R1 with a timestamp between 50 and 100.

The non-authoritative restore component 510 can be employed to perform a logical, item level backup, for example. Pursuant to this example, the API 530 employed can be an item level restore API that can populate the contents of the target store 540. The non-authoritative restore component 510 can create a new database and then restore all items from the backup data individually, including Replica, Mapping, and Conflict Items. Additionally, the non-authoritative restore component 510 can specify a RESTORE_SYNC_METADATA option to the API 530 (e.g., DeSerializeItem API), which facilitates restoring metadata associated with change tracking at a change unit level, sync metadata for global id mapping, metadata associated with conflict items related to unresolved conflicts, metadata pertaining to replica items for replica and partner information, and/or metadata associated with mapping items. Pursuant to an example, the non-authoritative restore component 510 can restore items from all incremental backups, although the subject invention is not so limited. The API 530 can additionally restore tombstones and item sync information in side tables for items in a replica. By way of further illustration, the non-authoritative restore component 510 can restore data from a physical backup. A restore of backup data from a physical store backup can enable restoring data including the side tables that comprise the move log as well as additional information.

Figure 6:
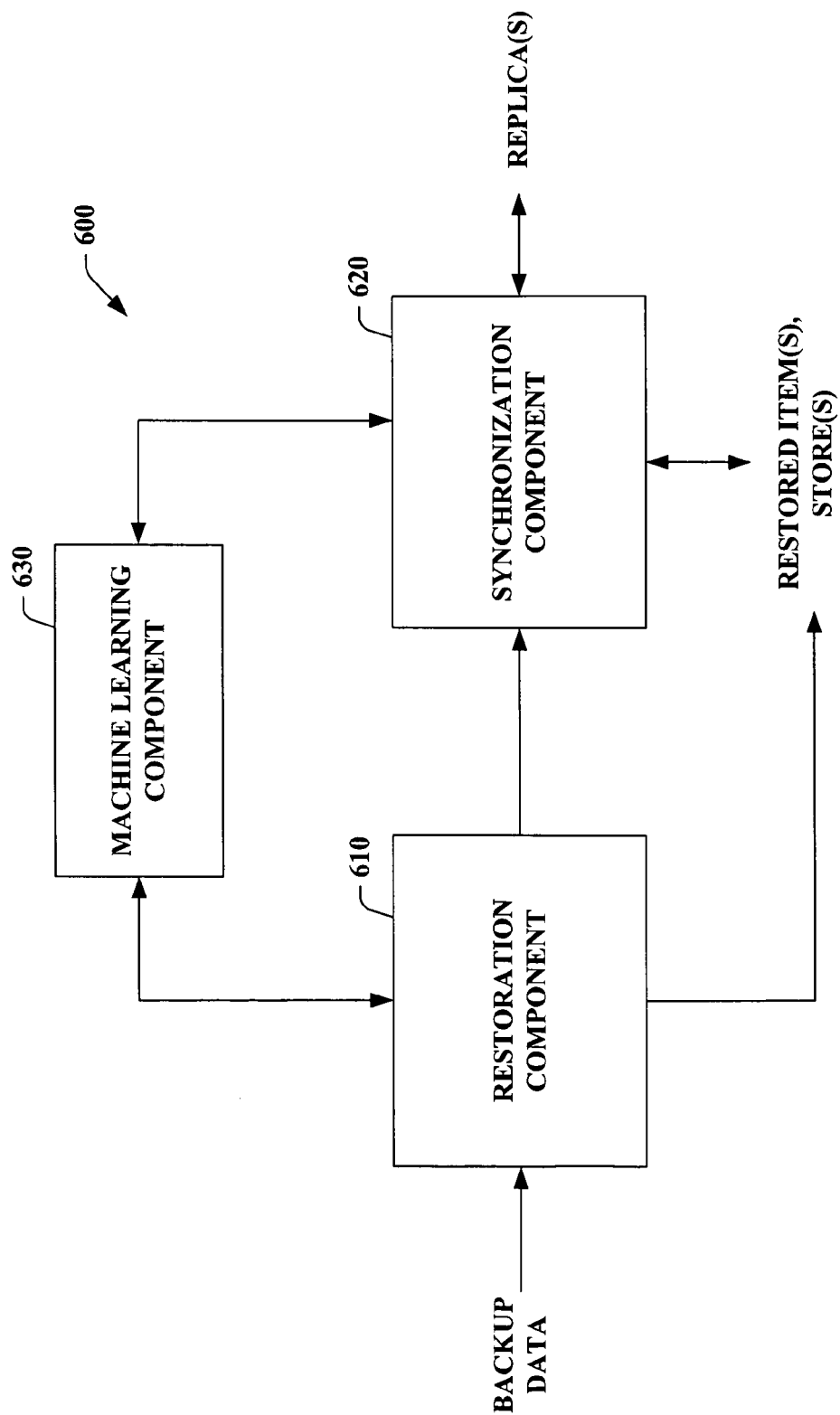
FIG. 6 illustrates a block diagram of a system that facilitates restoring and/or synchronizing data in accordance with an aspect of the subject invention.

FIG. 6 illustrates a system 600 that facilitates restoring and/or synchronizing data in accordance with an aspect of the subject invention. The system 600 includes a restoration component 610 that receives backup data (e.g., a copy of an item and/or store, metadata associated with the copied item and/or store, . . . ) and restores the item(s) and/or store(s). The restoration component 610, for example, can perform an authoritative restore, a non-authoritative restore, etc. Additionally, a synchronization component 620 is existent within the system 600. The synchronization component 610 appropriately synchronizes the restored item(s) and/or store(s) with respective replica(s).

The system 600 further comprises a machine learning component 630, which can be employed by the restoration component 610, the synchronization component 620 (and/or the authoritative restore component 330 of FIG. 3, the non-authoritative restore component 340 of FIG. 3, the timestamp updating component 420 of FIG. 4, the API 430 of FIG. 4, the renaming component 520 of FIG. 5, the API 530 of FIG. 5, . . . ) in connection with restoring item(s) (e.g., via an authoritative restore, a non-authoritative restore, . . . ) and/or synchronizing the item(s) with replica(s) of the item(s). Machine learning refers to an area of artificial intelligence concerned with development of techniques that allow computers and/or programs to "learn." More particularly, machine learning can relate to methods for creating and/or modifying computer programs based at least in part upon an analysis of data set(s). Thus, the restoration component 610 and/or the synchronization component 620 can operate more efficiently over time as more contextual data, user history, application history, and the like is collected.

Furthermore, the machine learning component 630 can make inferences relating to determining an appropriate type of restoration to employ via the restoration component 610. As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Thus, the restoration component 610, the synchronization component 620 (and/or the authoritative restore component 330, the non-authoritative restore component 340, the timestamp updating component 420, the API 430, the renaming component 520, the API 530, . . . ) given particular contextual data, can make inferences relating to restoring and/or synchronizing items. According to an example, the restoration component 610 can employ the machine learning component 630 to infer when to restore backup data. By way of example, the machine learning component 630 can identify disk failure and thereafter initiate restoration of the backup data via the restoration component 610. Additionally, the machine learning component 630 can be employed to identify an appropriate restoration type (e.g., authoritative restore, non-authoritative restore, . . . ).

Figure 7:
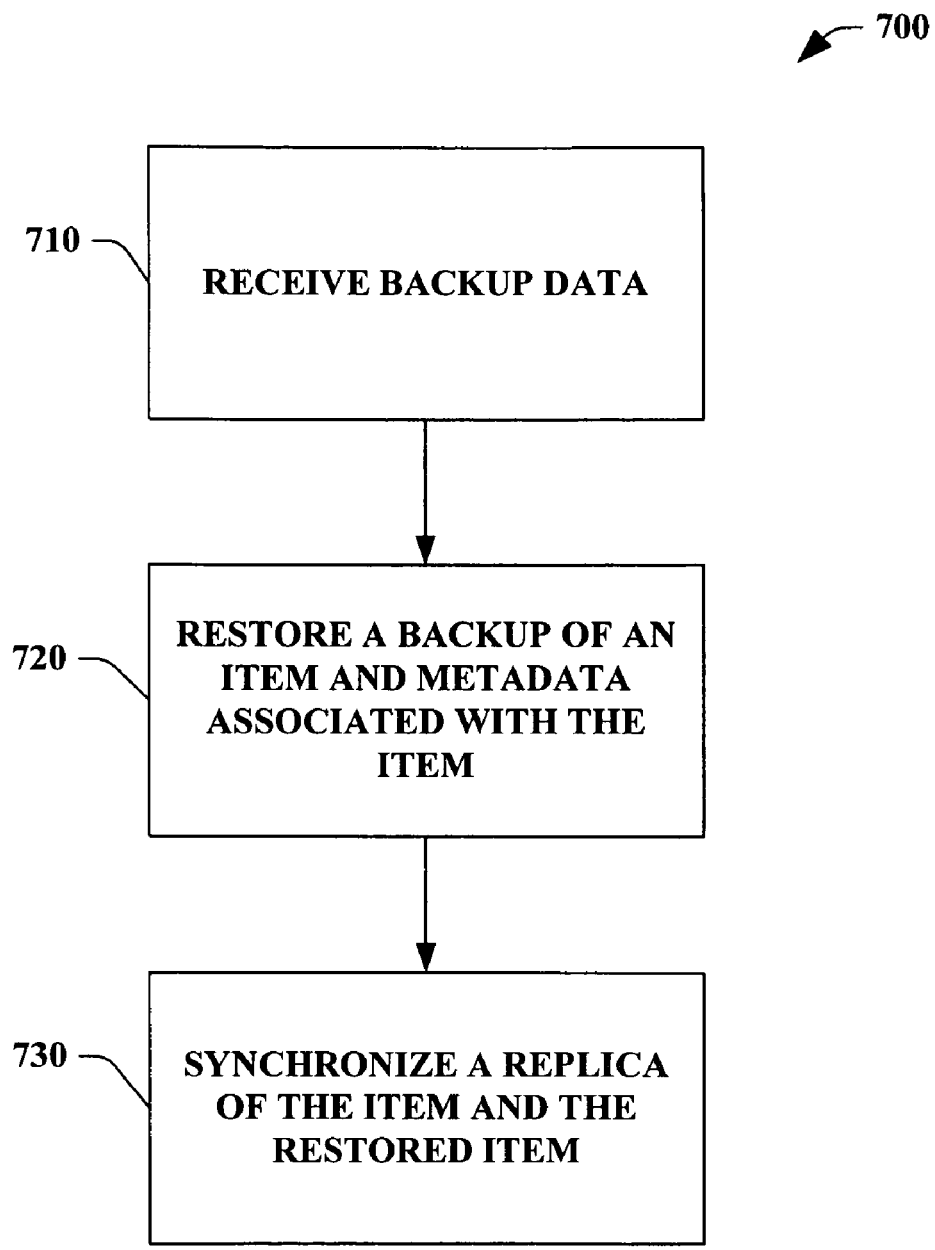
FIG. 7 illustrates a flow chart of an exemplary methodology that facilitates restoring an item and synchronizing the restored item and a replica of the item in accordance with an aspect of the subject invention.
Figure 8:
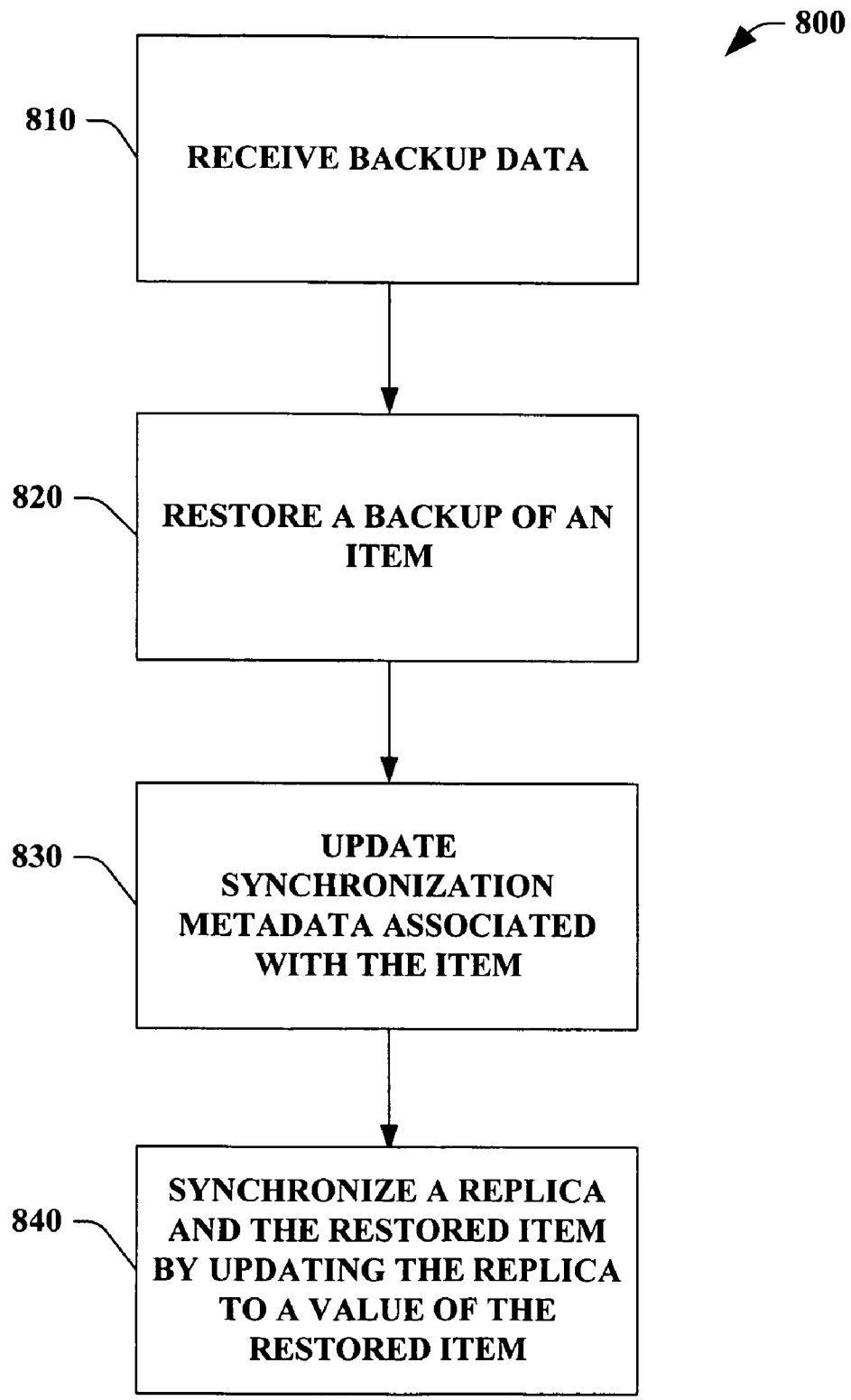
FIG. 8 illustrates a flow chart of an exemplary methodology that facilitates authoritatively restoring an item in a target store according to an aspect of the subject invention.
Figure 9:
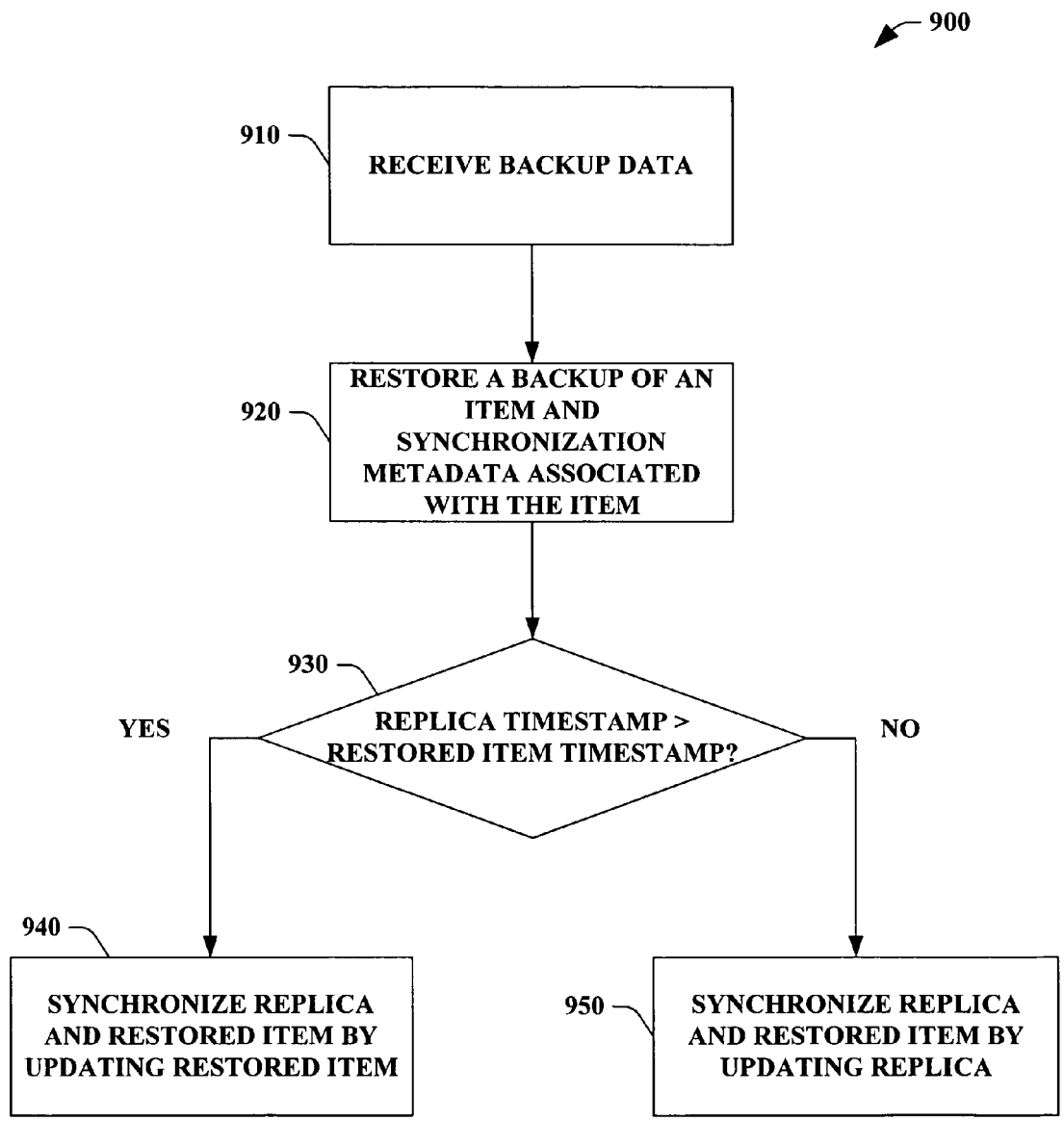
FIG. 9 illustrates a flow chart of an exemplary methodology that facilitates non-authoritatively restoring an item in a target store in accordance with an aspect of the subject invention.

FIGS. 7-9 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 7 illustrates a methodology 700 that facilitates restoring an item and synchronizing the restored item and a replica of the item in accordance with an aspect of the subject invention. At 710, backup data is received. The backup data can include a copy of one or more items, one or more stores of items, and/or metadata associated with the item(s). The backup data can be associated with a full backup, an incremental backup, etc. Additionally, the backup data can be related to an item level backup, a store level backup, and/or a backup with any granularity. At 720, a backup of an item and/or metadata associated with the item is restored. The restore can be, for example, an authoritative and/or a non-authoritative restore. Additionally, a single item can be restored, an entire data store can be restored, or any number of items can be restored. At 730, the restored item and the replica are synchronized. The subject invention contemplates that any number of replicas can be synchronized with the restored item. The restored item and the replica can be synchronized in accordance with the type of restore performed (e.g., authoritative restore, non-authoritative restore, . . . ).

Turning to FIG. 8, illustrated is a methodology 800 that facilitates authoritatively restoring an item in a target store according to an aspect of the subject invention. At 810, backup data is received. A backup of the item is restored (e.g., authoritative restore) in the target store at 820. At 830, synchronization metadata associated with the item is updated. For example, the metadata can include a timestamp, which can be updated to a current time. By way of illustration, the timestamp can be updated by creating new items and/or replacing items in the target store. At 840, a replica of an item and the restored item are synchronized by updating the replica to a value of the restored item. Thus, the replica is updated to the value of the backup version of the item.

FIG. 9 illustrates a methodology 900 that facilitates non-authoritatively restoring an item in a target store in accordance with an aspect of the subject invention. At 910, backup data is received. The backup data can be received, for example, from any storage medium upon which the backup data is stored. At 920, a backup of an item and synchronization metadata associated with the item are restored. The restoration can provide the restored data with a new ReplicaId and restore the other change tracking information from the backup, for example. Pursuant to this example, utilization of the new ReplicaId facilitates updating the restored data with changes that were performed subsequent to the backup. At 930, it is determined whether a timestamp associated with a replica is greater than the timestamp of the restored item. These timestamps can be stored in the metadata associated with the respective items. The timestamp associated with the restored item is based on the time at which a backup was conducted. If the timestamp of the replica is greater than the timestamp of the restored item, then the method 900 proceeds to 940 where the replica and the restored item are synchronized via updating the restored item. In such a case, the replica is more up to date and can be employed to update the restored item. If the timestamp of the replica is not greater than the timestamp of the restored item, then at 950 the replica and the restored item are synchronized via updating the replica, since the restored item is more up to date. The updating of the restored item and/or the replica can involve performing operations such as creating items, deleting items, updating items, moving items, etc.

Figure 10:
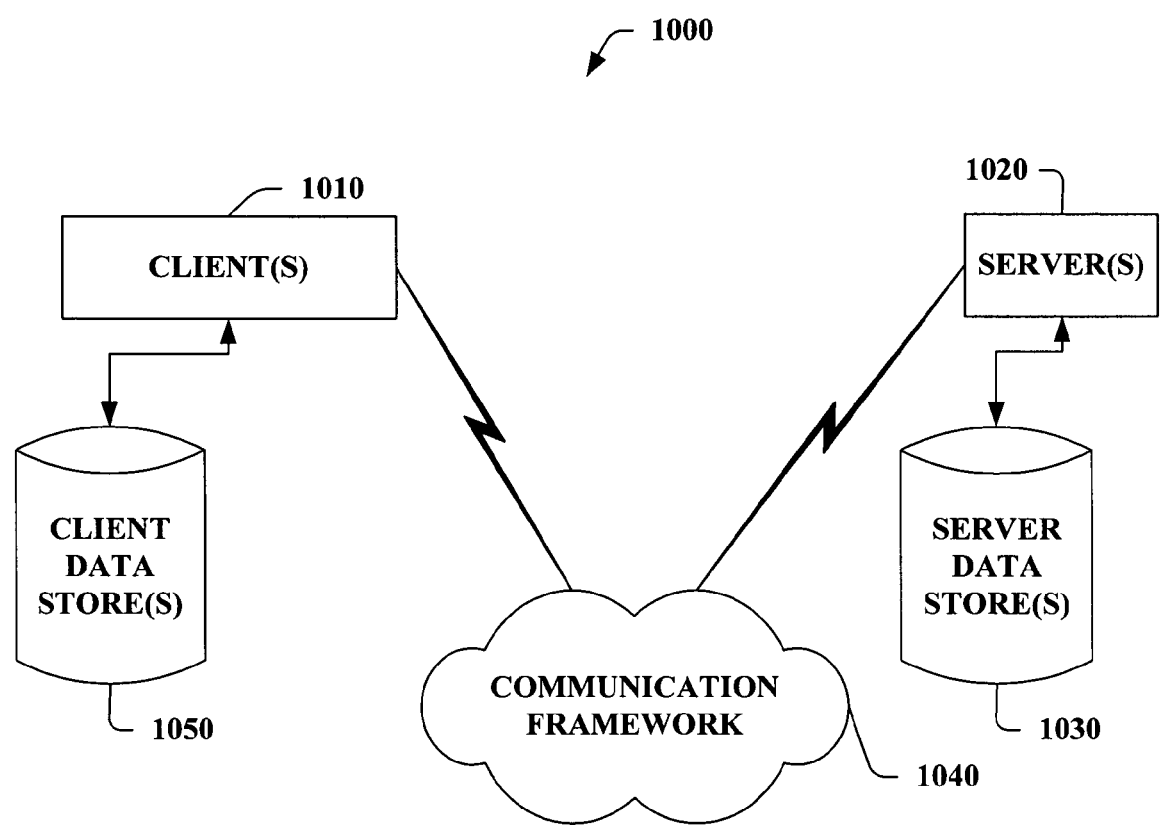
FIG. 10 illustrates an exemplary networking environment, wherein the novel aspects of the subject invention can be employed.
Figure 11:
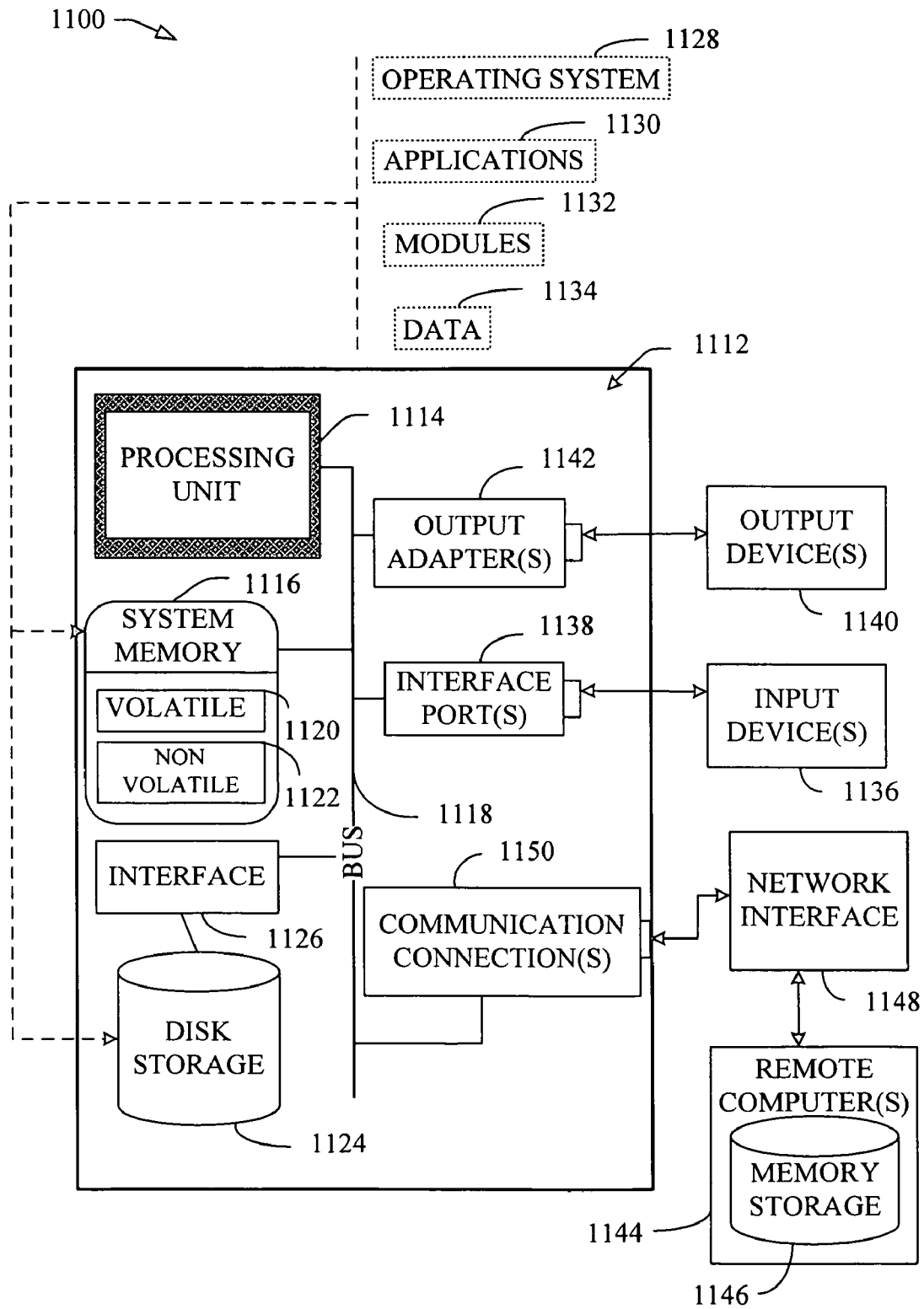
FIG. 11 illustrates an exemplary operating environment, wherein the novel aspects of the subject invention can be employed.

In order to provide additional context for implementing various aspects of the subject invention, FIGS. 10-11 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1020. The server(s) 1020 can be hardware and/or software (e.g., threads, processes, computing devices). The servers 1020 can house threads to perform transformations by employing the subject invention, for example.

One possible communication between a client 1010 and a server 1020 can be in the form of a data packet adapted to be transmitted between two or more computer processes. The system 1000 includes a communication framework 1040 that can be employed to facilitate communications between the client(s) 1010 and the server(s) 1020. The client(s) 1010 are operably connected to one or more client data store(s) 1050 that can be employed to store information local to the client(s) 1010. Similarly, the server(s) 1020 are operably connected to one or more server data store(s) 1030 that can be employed to store information local to the servers 1040.

With reference to FIG. 11, an exemplary environment 1100 for implementing various aspects of the invention includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example a disk storage 1124. Disk storage 1124 includes, but is not limited to, devices like a magnetic disk drive, floppy disk drive, tape drive, Jaz drive, Zip drive, LS-110 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the subject invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates restoring an item in a target store comprising:
    a computer processor for executing the following components:
    a restoration component that restores a backup of an item and synchronization metadata associated with the item in a target store; and
    a synchronization component that utilizes the synchronization metadata associated with the item to synchronize the restored item with a replica of the item to enable the restored item and the replica to converge, wherein either changes made to the restored item are applied to the replica, or changes made to the replica that are more current than the changes made to the restored item and are applied to the restored item, the item and the replica of the item are stored in data stores on disparate devices;
    a timestamp updating component that implements an authoritative restore by updating a timestamp of the restored item in the target store to be a most current timestamp such that the replica is updated to a value of the restored item;
    a renaming component that implements a non-authoritative restore by renaming the restored item such that the replica communicates the more current changes to the restored item; and
    a machine learning component that provides inferences regarding a type of restoration to employ via the restoration component based on one or more of context data, user history or application history.

2. The system of claim 1, the restoration component comprises an authoritative restore component that updates the synchronization metadata associated with the item.

3. The system of claim 2, the synchronization component utilizes the updated synchronization metadata to cause the replica to converge to a value of the restored item.

4. The system of claim 2, further comprising an API that at least one of creates an item in the target store and replaces an item in the target store, the API updates the synchronization metadata associated with the item.

5. The system of claim 2, the authoritative restore component enables returning to a backed up version of the item.

6. The system of claim 1, the restoration component comprises a non-authoritative restore component that enables the synchronization component to reapply changes made since a time of the backup.

7. The system of claim 6, the non-authoritative restore component is utilized to perform a restoration upon occurrence of a media failure.

8. The system of claim 1, the synchronization metadata comprises at least one of timestamps on entities, change tracking at a change unit level, sync metadata for global id mapping, tombstones for tracking deletes, a move log for tracking item moves, conflict items for keeping track of unresolved conflicts, replica items for replica and partner information and mapping items.

9. A method that facilitates restoring an item in a target store, comprising:
    employing a processor to execute computer executable instructions stored in memory to perform the following acts:
    restoring a backup of an item and synchronization metadata associated with the item in a target store; and
    comparing timestamps in the metadata of the restored item and metadata of a replica of the item;
    determining more recent changes based on comparison of changes made to the restored item and changes made to the replica;
    synchronizing the restored item and the replica of the item based on the synchronization metadata to enable the restored item and the replica to converge, wherein changes made to the restored item are applied to the replica, or changes made to the replica that are more current than the changes made to the restored item are applied to the restored item based at least synchronization metadata, the item and the replica of the item are stored in data stores on disparate devices;
    effecting an authoritative restore by updating a timestamp of the restored item in the target store, to be a most current timestamp such that the replica is updated to a value of the restored item if changes made to the restored item are applied to the replica;

effecting a non-authoritative restore renaming the restored item such that the replica communicates the more current changes to the restored item if changes to the replica are more current as compared to changes made to the restored item; and using inferences collected over time to determine one of an authoritative or non-authoritative restore based on one or more of context data, user history or application history.

10. The method of claim 9, further comprising updating the synchronization metadata to facilitate performing an authoritative restore.

11. The method of claim 10, further comprising updating the replica with a value of the restored item.

12. The method of claim 10, further comprising updating the restored item upon determining that changes occurred to the replica subsequent to the backup.

13. The method of claim 10, further comprising updating the replica upon determining that the backup of the item comprises changes that were not incorporated into the replica.

14. The method of claim 9, further comprising renaming a disparate replica associated with the restored item to facilitate performing a non-authoritative restore.

15. A computer storage medium having computer-executable instructions for performing the method of claim 9.

* * * * *